(12) United States Patent
Endo et al.

(10) Patent No.: US 6,474,972 B1
(45) Date of Patent: Nov. 5, 2002

(54) RESIN EXTRUSION APPARATUS

(75) Inventors: Seiichiro Endo, Fukushima-ken (JP);
Takayuki Tanaka, Hyogo (JP);
Takamitsu Matsui, Fukushima-ken (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 111 days.

(21) Appl. No.: 09/680,219

(22) Filed: Oct. 6, 2000

(30) Foreign Application Priority Data

Oct. 6, 1999 (JP) .......................................... 11-285646

(51) Int. Cl.[7] .......................... B29C 47/60; B29C 47/92
(52) U.S. Cl. ...................... 425/148; 366/76.2; 366/141; 425/155; 425/376.1
(58) Field of Search ................................ 425/148, 155, 425/376.1, 461; 366/76.3, 76.93, 141, 76.2

(56) References Cited

U.S. PATENT DOCUMENTS

| | | | | |
|---|---|---|---|---|
| 5,110,521 A | * | 5/1992 | Moller | 425/148 |
| 5,165,941 A | * | 11/1992 | Hawley | 425/148 |
| 5,261,743 A | * | 11/1993 | Moller | 366/76.3 |
| 5,589,203 A | * | 12/1996 | Sato | 425/148 |
| 5,627,346 A | * | 5/1997 | Weibel et al. | 366/141 |
| 6,340,487 B1 | * | 1/2002 | Wenger et al. | 425/148 |

FOREIGN PATENT DOCUMENTS

JP     A60110411     6/1985

* cited by examiner

*Primary Examiner*—Jan H. Silbaugh
*Assistant Examiner*—Joseph Leyson
(74) *Attorney, Agent, or Firm*—Birch, Stewart, Kolasch & Birch, LLP

(57) ABSTRACT

A resin extrusion apparatus having a weighing device (11) connected to a controller (18). A powder container (12) for supplying a powder (Y) to a resin extruder (20), a screw (13), and a motor (14) are installed over the weighing device 11. The motor (14) rotates a powder feeder (10) in proportion to a frequency of an inverter (17) connected to the controller (18). The powder feeder (10) is installed on the resin extruder (20). The powder feeder (10) supplies the powder (Y) to the resin extruder (20) quantitatively by a feedback control that is executed at regular intervals. The resin extruder (20) heats and kneads the powder (Y) and a resin (X) supplied thereto from a hopper (21) to form a resin pellet P containing the powder (Y) and the resin (X) mixed uniformly with each other.

4 Claims, 10 Drawing Sheets

_US 6,474,972 B1_

RESIN EXTRUSION APPARATUS

BACKGROUND OF THE INVENTION

1. Field of the Invention

The present invention relates to a method of supplying a powder to be added to a resin and a resin extrusion apparatus. More particularly, in the present invention, to produce a resin pellet containing a coloring powder and a resin mixed uniformly with each other, the powder is quantitatively supplied to an intermediate portion of the resin extruder.

2. Description of the Related Art

In producing a resin pellet by mixing coloring powder with a thermoplastic resin serving as the material of the resin pellet, two methods are known. In one method, after the resin and the powder are stirred, the mixture is supplied to a resin extruder. In the other method, after the resin is supplied to the resin extruder, the powder is added to the resin and the powder and resin are mixed with each other.

FIG. 8A shows the case where the resin and the powder are stirred. In this case, after a thermoplastic resin X and a predetermined amount of a coloring powder Y are supplied to a stirrer 2 such as a tumbler and stirred, the resin X and the powder Y are supplied to a resin extruder 1 through a hopper 1a. The resin extruder 1 heats and kneads the resin X and the powder Y and extrudes the mixture from a die 3 disposed at the front end of the extruder 1. After the mixture is cooled in a water tank 4, it was cut to produce a resin pellet P.

FIG. 8B shows the case in which the powder Y is added to the resin X after the resin X is supplied to the extruder. In this case, initially, the thermoplastic resin X is supplied to a resin extruder 1' from a hopper 1a', whereas the powder Y is supplied to an intermediate portion of the resin extruder 1' through a screw 6a of a powder feeder 6. Thereafter, the resin extruder 1' produces a resin pellet P in a manner similar to the above-described manner.

To produce a uniform resin pellet P having non-uniformity in color or the like, it is necessary to quantitatively supply the powder Y to a predetermined amount of the resin X and mix them with each other. In the case where the stirrer 2 is used, the powder Y having a larger weight than the resin X tends to concentrate in the lower part of a stirring chamber 2a when the stirred resin X and the powder Y are supplied to the resin extruder 1. The tendency is conspicuous when a large amount of the powder Y is added to the resin X. Consequently, the amount of the powder Y to the resin extruder 1 is large in an early time period from the start of production and small in the neighborhood of the termination thereof. Thus, there is a variation in the content of the powder Y in the resin pellet P.

In the case where the powder feeder 6 is used, it is impossible to make compensation when there is a difference between a set supply amount of the powder Y and an actual supply amount. This is because the screw 6a of the powder feeder 6 is rotated at a constant speed. Consequently, there is a variation in the specific gravity of the produced resin pellet P and a defective dispersion of the powder Y. Such a disadvantage occurs frequently in the case where barium nitrate and tungsten having a high specific gravity, respectively are used as the powder Y.

As shown in FIG. 9, in Japanese Patent Application Laid-Open No. 60-110411, there is disclosed a powder feeder 6' which supplies powder to be added to resin quantitatively by using a measuring instrument. The powder feeder 6' has a storing hopper 7' provided with a supply mechanism 7a' of cut-gate type, a supply container 6b' installed on a measuring mechanism 8', a spring feeder 6c' whose one end is located inside the supply container 6b', and a power 6d' for the spring feeder 6c'. In the powder feeder 6', the opening and closing of the supply mechanism 7a' of cut-gate type and the rotation of the power 6d' are controlled according to a numerical value measured by the measuring mechanism 8'.

To supply the powder Y to the resin extruder 1" by means of the powder feeder 6', the powder Y is supplied to the storing hopper 7', the supply mechanism 7a' of cut-gate type is opened and closed appropriately, a required amount of the powder Y is dropped to the supply container 6b', and a predetermined amount of the powder Y is dropped to a pneumatic feeder 9 by the rotation of the spring feeder 6c'. The pneumatic feeder 9 supplies the resin extruder 1" with the predetermined amount of the powder Y. The resin X is supplied to the resin extruder 1" from a hopper 1a".

The measuring mechanism 8' measures the weight of the powder Y. Thus, the powder feeder 6' can supply the powder Y quantitatively to the resin extruder 1". However, depending on the control system in which the supply mechanism 7a' of cut-gate type and the spring feeder 6c' are used, there is a possibility that the control system is incapable of following an actual powder supply operation. Thus, there may be a difference between a set supply amount and the actual supply amount. Another disadvantage of the powder feeder 6' is that the powder Y is supplied quantitatively to the resin extruder 1", together with the resin X. Thus, the powder feeder 6' has a problem similar to that of the resin extrusion apparatus using the stirrer 2.

SUMMARY OF THE INVENTION

The present invention has been made in view of the above-described problems. Thus, it is an object of the present invention to produce a resin pellet containing resin and powder mixed uniformly with each other by adopting a system of not mixing the resin and the powder with each other beforehand but quantitatively supplying the powder to a resin extruder at an intermediate portion of the resin extruder.

To achieve the object, according to the present invention, there is provided a resin extrusion apparatus including a resin extruder for extruding a thermoplastic resin supplied thereto from one end thereof to the outside from the other end thereof; a screw, driven by a motor, for supplying powder from a powder container to the resin extruder at an intermediate portion thereof, an inverter for setting the number of rotations of the motor for driving the screw; a controller controlling a frequency of the inverter; a weighing device, connected to the controller, for measuring an actual supply amount of the powder in a predetermined time period; and a detector for transmitting a measured value to the controller. Supposing that a set supply amount (g) of the powder in the predetermined time period is A; a tolerance (g) of the set supply amount is B; the actual supply amount (g) of the powder, in the predetermined time period, measured by the weighing device is C; a frequency (Hz) of the inverter is D; a feedback coefficient is E; and a frequency (Hz) of the inverter after a feedback control is executed is F, when $|A-C| \leq B$, the feedback coefficient E is set in the range of $0.1 \leq E \leq 0.7$ and when $|A-C| > B$, the feedback coefficient E is set in the range of $0.8 \leq E \leq 1.2$.

Thereby, the powder is quantitatively supplied to an intermediate portion of the resin extruder by means of a rotation of the screw, based on the feedback-controlled inverter frequency:

$$F=D+E\times\{(A-C)\times D/C\}.$$

It is possible to recognize the difference between the set supply amount of the powder and the actual supply amount thereof by detecting the actual supply amount thereof. It is possible to rotate the screw according to a powder supply state and thus supply the powder quantitatively to the resin extruder by making the feedback control such that the difference is compensated. More specifically, in the case where the actual supply amount of the powder becomes smaller than the set supply amount thereof owing to various situations, compensation is made to increase the supply amount of the powder. On the other hands, in the case where the actual supply amount of the powder becomes larger than the set supply amount thereof, compensation is made to decrease the supply amount thereof. In this manner, the supply amount thereof can be so controlled as to approach it to the set value. Measurement is executed at regular intervals in the range of 10 seconds to 180 seconds. The feedback control is executed in correspondence to the measurement. The shorter the measuring time period is, the more accurately the feedback control can be accomplished. The supply position of the powder to the resin extruder is different from that of the resin. That is, the supply position of the powder is located at an intermediate portion of the resin extruder. Thus, it is possible to secure the set supply without the powder and the resin interacting with each other.

Describing the feedback control in detail, the numerical value of the feedback coefficient is set depending on whether the detected measured supply amount C lies within the tolerance of the set supply amount A, and feedback coefficient E and the other set values are substituted into the control equation. In this manner, the powder can be supplied to the resin extruder reliably. The feedback coefficient E and the other set values are set in consideration of the material and amount of the resin and the powder and reflect experimental numerical values. Accordingly, the feedback control can be accomplished in conformity to an actual situation.

The supply amount of the powder is detected by the weighing device. A signal corresponding to the detected measured supply amount of the powder is transmitted to the controller connected to the inverter to execute the feedback control. The use of the weighing device allows the actual supply amount to be measured reliably and the inverter frequency to be set appropriately according to conditions owing to the connection between the controller and the inverter. For example, the weighing device measured the actual supply amount of the powder two to five times successively at regular intervals. The feedback control is executed by using a computed average value of the measured values as the measured supply amount C in each of the measuring time periods. It is possible to execute the feedback control precisely because the feedback control is executed not for each measurement but by computing the average value after measuring the actual supply amount of the powder two to five times successively. To compute the average value, for example, the average value is computed after measurement is executed five times at regular intervals of 15 seconds and then the feedback control is executed to determine the inverter frequency. Thereafter, this operation is repeated and the feedback control is executed at the intervals of 75 seconds .

DETAILED DESCRIPTION OF THE PREFERRED EMBODIMENTS

The embodiments of the present invention will be described below with reference to the drawings.

Figure 1:
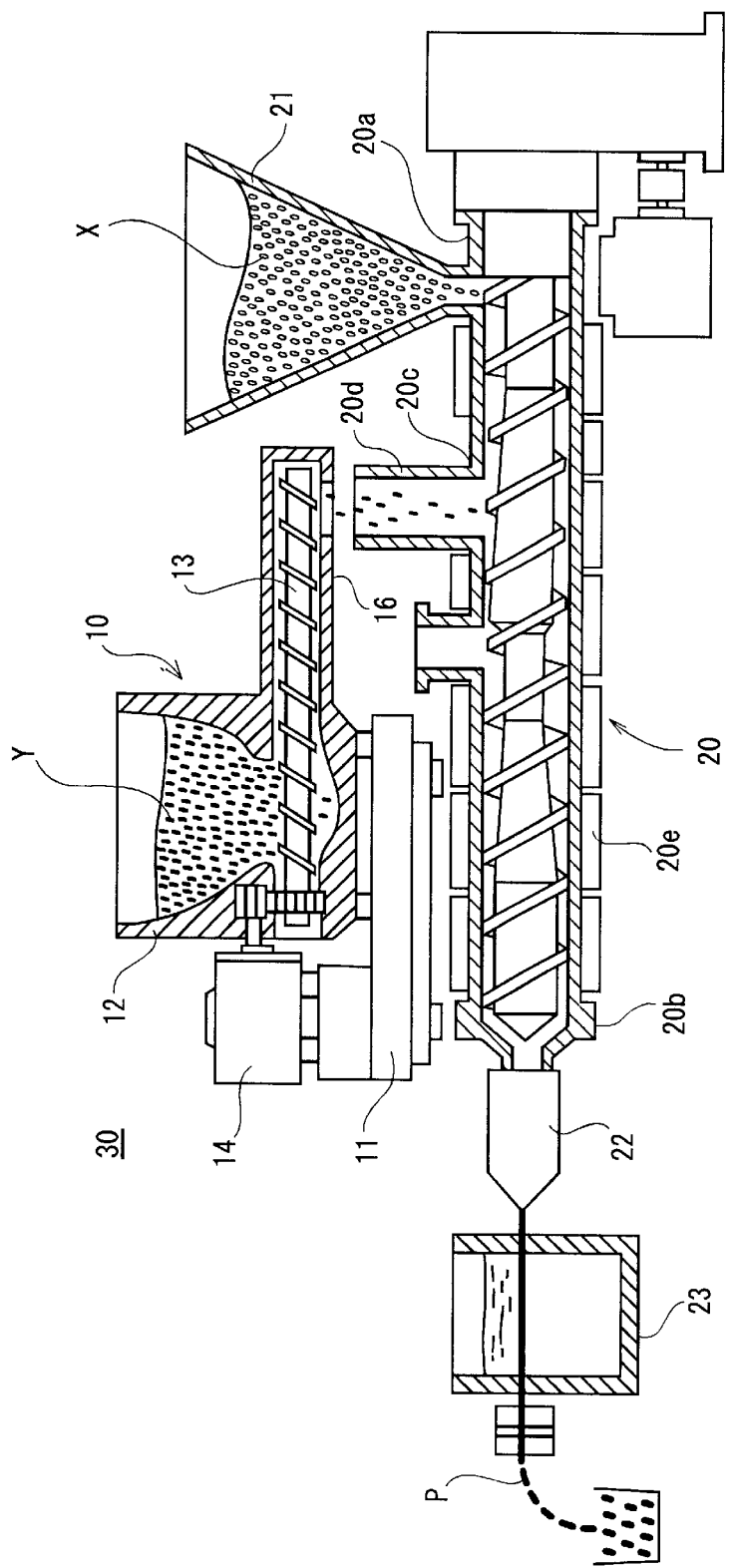
FIG. 1 is a schematic view showing an entire resin extrusion apparatus of the present invention having a powder feeder.

FIG. 1 shows a resin extrusion apparatus 30 of the resin extrusion apparatus having a powder feeder 10 and a resin extruder 20. In the embodiment, the resin extruder 20 of vent type is used. The resin extruder 20 heats and kneads a thermoplastic resin X supplied to a hopper 21 located at one side 20a, namely, a material supply side thereof and a coloring powder Y supplied thereto by the powder feeder 10. Then the mixture of the resin X and the powder Y is extruded from a die 22 positioned at the other side of the resin extruder 20. The extruded resin X mixed with the powder Y is passed through a water tank 23 and then cut to produce a resin pellet P. Instead of vent type, the resin extruder 20 of other types may be used.

Figure 2:
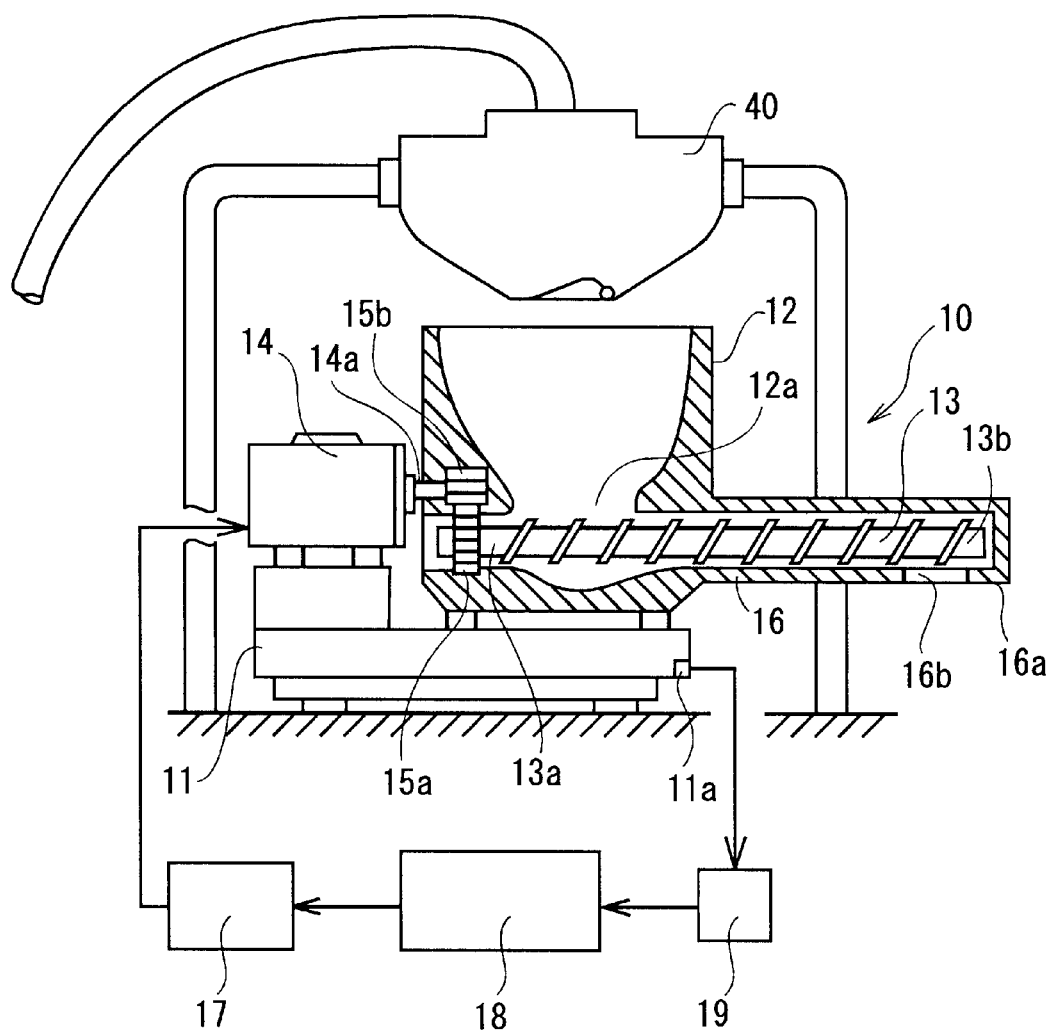
FIG. 2 is a schematic view showing the powder feeder.

As shown in FIGS. 1 and 2, the powder feeder 10 has a weighing device 11, a powder container 12, a screw 13, and a driving motor 14. The powder container 12, the screw 13, and the driving motor 14 are installed over the weighing device 11 to measure the total of the mass of the powder container 12, the screw 13, the driving motor 14, and the powder Y supplied to the powder container 12. The rotation of the motor 14 is transmitted to the screw 13 by engaging a first gear 15a installed at one end 13a of the screw 13 with a second gear 15b installed on an output shaft 14a of the motor 14. To allow the weighing device 11 to have measuring accuracy at a measuring time, the powder container 12 has a small volume. To avoid influence of the rotation of the motor 14 and that of the screw 13 on other parts, the motor 14 and the screw 13 are compact. Thus, a hopper 40, separate from the weighing device 11, storing the powder Y by pneumatic feeding is provided above the powder container 12 so that the hopper 40 supplies a necessary amount of the powder Y to the powder container 12 appropriately.

One end 13a of the screw 13 is located at a lower portion 12a of the inside of the powder container 12. A conveying pipe 16 projecting from the powder container 12 accommodates the other end 13b, of the screw 13, located outward from the powder container 12 so that by the rotation of the screw 13, the powder Y supplied to the powder container 12 is delivered to an end 16a of the conveying pipe 16 projecting from the powder container 12. The powder Y delivered to the end 16a of the conveying pipe 16 drops from a supply port 16b of the conveying pipe 16 by gravity. The dropped powder Y is supplied to the resin extruder 20 through a supply portion 20d formed at an intermediate portion 20c of the resin extruder 20. Because the powder Y is supplied to the resin extruder 20 from the intermediate portion 20c of the resin extruder 20, a proper amount of the powder Y can be supplied to the resin extruder 20 in conformity to a set supply amount of the resin X, without the powder Y interacting with the resin X supplied to the resin extruder 20 from the hopper 21.

The motor 14 for rotating the screw 13 is of an AC type and rotates in proportion to the frequency of an inverter 17 connected to the motor 14. The inverter 17 is connected to a sequencer 18 serving as a controller for executing a feedback control of the frequency of the inverter 17. The sequencer 18 outputs a signal indicating the frequency to the inverter 17. The sequencer 18 is also connected to a measuring portion 11a of the weighing device 11 through a load cell amplifier 19 serving as a detector so that a signal indicating a numerical value measured by the weighing device 11 is sent to the sequencer 18. The sequencer 18 is also connected to switches provided on an operation panel (not shown) of the resin extrusion apparatus 30. Thus, upon turn-on or turn-off of the switches, the sequencer 18 controls the entire operation of the powder feeder 10 including the start and stop of the motor 14.

The following numerical values are set with the switches of the operation panel: a measuring time of a weighing device 11 per one powder supply operation, a supply amount of the powder Y per time period, a tolerance of a set supply amount, number of times of powder supply which is executed to take an average value, and the like. The set values are stored in a data register of the sequencer 18 to appropriately use them for the control of the supply of the powder Y. In addition to the switches of the operation panel, a personal computer or a touch panel may be installed by connecting them to the sequencer 18 to set the various numerical values with the personal computer or the touch panel. The personal computer or the touch panel may be used to monitor values measured with the weighing device 11 at regular time intervals, the number of rotations of the screw 13, and the like.

Figure 3:
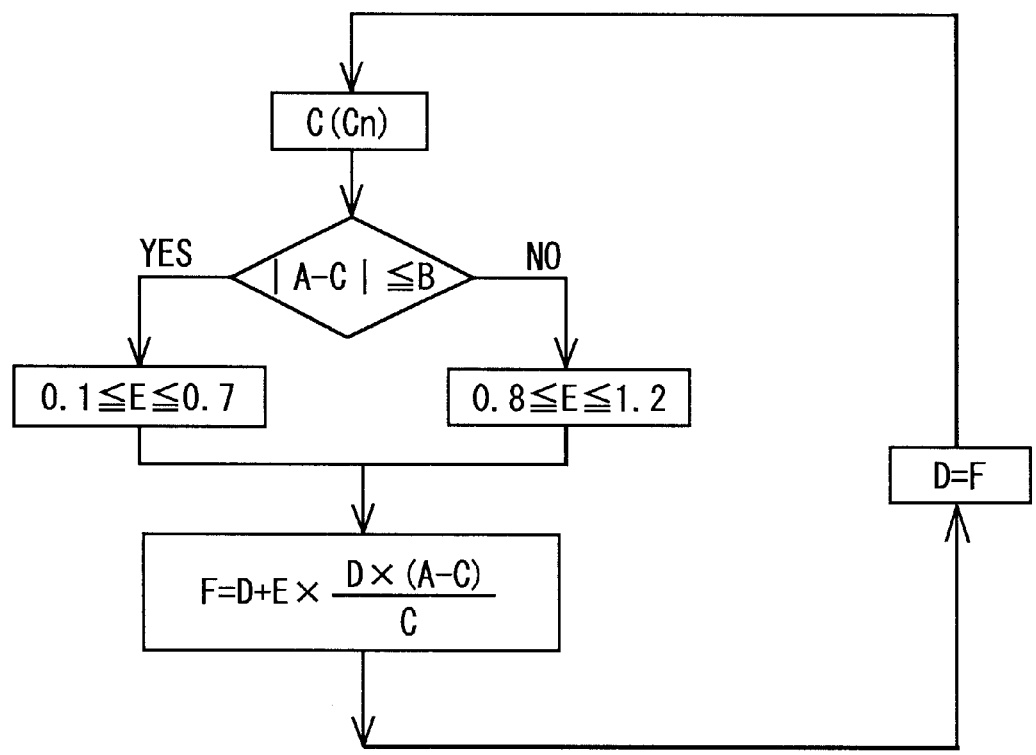
FIG. 3 is a flowchart of a feedback control for controlling a powder feeder.

The sequencer 18 stores a program produced in a so-called RADA circuit. The feedback control of the frequency of the inverter 17 is programmed based on a flowchart shown in FIG. 3. Referring to FIG. 3, reference symbol A denotes a set supply amount (g) of the powder Y per time period set beforehand; B denotes a tolerance (g) which is permitted for the set supply amount; C denotes an actual supply amount (g) of the powder Y supplied to the resin extruder 20 per time period. The actual supply amount (g) is measured with the weighing device 11; D denotes a predetermined frequency (Hz) of the inverter 17; E denotes a feedback coefficient; and F denotes a frequency (Hz) of the inverter 17 after the feedback control is executed.

The measurement of the numerical value of the actual supply amount C which is made by detection is determined by subtracting a value measured after elapse of a certain time period from an initial measured value. More specifically, for example, to determine a supply amount of the powder Y to the resin extruder 20 in first 15 seconds, an initial value is measured with the weighing device 11, and a value is measured after 15 seconds elapse. The value measured in 15 seconds is subtracted from the initial value. A solution of the subtraction is set as the actual supply amount C in the first 15 seconds. Thereafter, supply amounts are repeatedly measured at regular intervals of 15 seconds. That is, a value measured in an (n−1)th 15 seconds is subtracted from a value measured in an nth 15 seconds. A solution of the subtraction is set as the actual supply amount C in the nth 15 seconds. Signals corresponding to the measured supply amounts C are sent to the sequencer 18 through the load cell amplifier 19. Instead of using the measured supply amount C, as shown in FIG. 3, it is possible to use an average supply amount Cn obtained by averaging several measured values. To determine the average supply amount Cn, measurements are executed two to five times successively in a predetermined period of time and then the sum of measured values is divided by the number of measuring times.

In the case where the measured supply amount C (or $Cn_0$, hereinafter referred to as C) determined as described above lies within the tolerance B of the set supply amount A, i.e., when $|A-C| \leq B$, the numerical value of the feedback coefficient E is set in the range of $0.1 \leq E \leq 0.7$ and favorably in the range of $0.2 \leq E \leq 0.5$ with the switches of the operation panel. In the case where the measured supply amount C lies out of the tolerance B of the set supply amount A, i.e., when $|A-C| > B$, the numerical value of the feedback coefficient E is set in the range of $0.8 \leq E \leq 1.2$ and favorably in the range of $0.9 \leq E \leq 1.1$ with the switches of the operation panel. The range of the feedback coefficient E is set experimentally based on examples and comparison examples which will be described later.

The values of the set supply amount A through the feedback coefficient E determined as described above are substituted into an equation shown below to determine the inverter frequency F after the feedback control is executed:

$$F = D + E \times \{(A-C) \times D/C\}$$

The inverter frequency F thus determined is replaced with the predetermined inverter frequency F in the sequencer 18, and the sequencer 18 outputs a signal indicating the inverter frequency F to the inverter 17 to rotate the motor 14, based on the inverter frequency F. Thereafter, the above-described procedure is repeated to execute the feedback control every predetermined period of time. Thereby, the number of rotations of the motor 14 is adjusted appropriately to make compensation so that the difference between the actual supply amount C of the powder Y and the set supply amount A does not become large. In this manner, a quantitative supply of the powder Y is carried out.

The control method is described below in detail with reference to table 1 and the examples and the comparison examples shown in FIGS. 4 through 7.

TABLE 1

|  | E1 | CE1 | E2 | CE2 | E3 | CE3 | E4 |
|---|---|---|---|---|---|---|---|
| Measuring time (second) | 30 | 30 | 15 | 15 | 60 | 60 | 30 |
| Number of measuring times n | 1 | 1 | 51 | 5 | 1 | 1 | 3 |
| Set supply amount A(g) | 100 | 100 | 50 | 50 | 200 | 200 | 100 |
| Tolerance B(g) | 10 | 10 | 5 | 5 | 10 | 10 | 5 |
| Feedback coefficient E (within tolerance) | 0.2 | 0.9 | 0.7 | 0.1 | 0.5 | 0.0 | 0.2 |
| Feedback coefficient E (out of tolerance) | 1.0 | 1.0 | 1.2 | 1.5 | 0.8 | 0.5 | 1.0 |

Where E is example and CE is comparison example.

In the examples and the comparison examples, as the resin X, a mixture of ionomer which is a thermoplastic resin, Highmilan 1706 (produced by Mitsui Dupont Inc.) and Highmilan 1705 (produced by Mitsui Dupont Inc.) was used, and as the coloring powder Y, tungsten C50H (produced by Tokyo Tungsten Inc.) was used. The temperature of a heating cylinder 20e of the resin extruder 20 was set to 180° C. to 200° C. The feedback coefficients of the examples and the comparison examples were set to different values. The results obtained after the feedback controls were executed were investigated as follows:

In the first example and the first comparison example, the weighing device 11 measured the actual supply amount C at regular intervals of 30 seconds. The set supply amount A in 30 seconds was set to 100 g. The tolerance B of the set supply amount A was set to 10 g. The initial predetermined inverter frequency D was set commonly to 35 Hz. In the first example, the feedback coefficient E was set to 0.2 in the case where the actual supply amount C measured by the weighing device 11 lied within the tolerance B, whereas the feedback coefficient E was set to 1.0 in the case where the actual supply amount C measured thereby lied out of the tolerance B. In the first comparison example, the feedback coefficient E was set to 0.9 in the case where the actual supply amount C lied within the tolerance B, whereas the feedback coefficient E was set to 1.0 in the case where the actual supply amount C lied out of the tolerance B.

Figure 4:
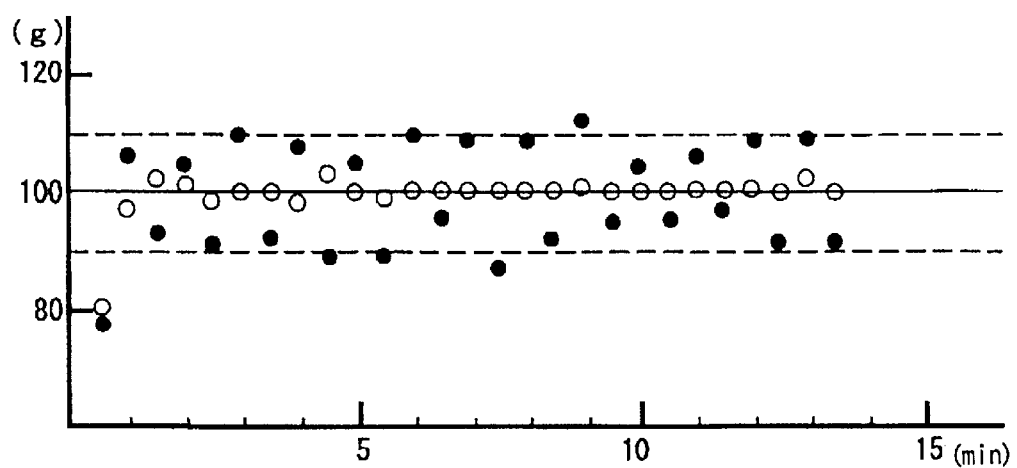
FIG. 4 is a graph showing a change of a measured supply amount with time in a first example and a first comparison example.

The powder feeder 10 was operated based on the above-described set values. As shown in FIG. 4, in the first example, with the elapse of five minutes after the start of the operation, the measured supply amount C was almost in accord with 100 g which was the set supply amount A and was kept constantly at 100 g without fluctuation. Accordingly, a predetermined amount of the powder Y was supplied to the resin extruder 20 and thus could be reliably mixed with the resin X. Thus the resin extruder 20 produced a uniform non-defective resin pellet P. In the first comparison example, in the case where the measured supply amount C lied out of the tolerance B, compensation was executed to return the measured supply amount C to the tolerance B by the feedback control, but in the case where the measured supply amount C lied within the tolerance, it fluctuated larger or smaller than 100 g which was the set supply amount A, and the fluctuation was not suppressed with the elapse of time. That is, a so-called hunting phenomenon occurred and the powder was supplied to the resin extruder 20 unstably. Consequently, the resin pellet P produced in the first comparison example was nonuniform.

The result of the first example and the first comparison example indicate that it is preferable to set the feedback coefficient E to $0.2 \leq E \leq 0.9$ in the case where the actual supply amount C lies within the tolerance B and set it to numerical values in the neighborhood of 1.0 in the case where the actual supply amount C lies out of the tolerance B.

In the second example and the second comparison example, instead of using the measured supply amount C, the feedback control was executed by using the average supply amount Cn. The weighing device 11 measured the actual supply amount C at regular intervals of 15 seconds. The number (n) of measuring times for determining the average supply amount Cn was set to five. The set supply amount A in 15 seconds was set to 50 g. The tolerance B of the set supply amount A was set to 5 g. The initial predetermined inverter frequency D was set to 35 Hz. By setting thus, the feedback control was executed at regular intervals of 75 seconds.

To estimate an upper limit of the feedback coefficient E within the tolerance B, in the second example, the feedback coefficient E was set to 0.7 smaller than that of the first comparison example which was 0.9. To estimate a lower limit of the feedback coefficient E within the tolerance B, in the second comparison example, the feedback coefficient E was set to 0.1 smaller than that of the first example which was 0.2. To estimate an upper limit of the feedback coefficient E out of the tolerance B, in the second example, the feedback coefficient E was set to 1.2 larger than that of the first comparison example which was 1.0 and set to 1.5 in the second comparison example.

Figure 5:
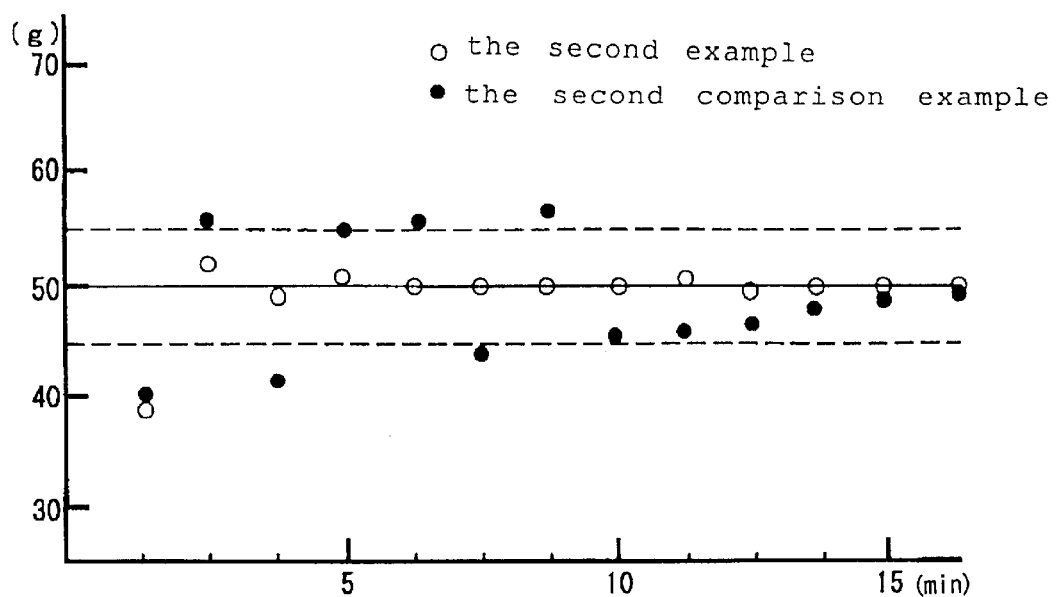
FIG. 5 is a graph showing a change of a measured supply amount with time in a second example and a second comparison example.

As shown by the graph of FIG. 5, in the second example, even though the measured supply amount C was out of the tolerance B soon after the measurement started, the measured supply amount C lay within the tolerance B by the feedback control. With the elapse about five minutes after the start of the measurement, the actual supply amount C was in accord with 50 g which was the set supply amount A and was constantly 50 g thereafter. Thus, the powder Y could be reliably supplied to the resin extruder 20 and thus uniform non-defective resin pellet P could be produced by the resin extruder 20. Accordingly, it was confirmed that the predetermined amount of the powder Y could be also supplied to the resin extruder 20 by setting the feedback coefficient E appropriately in the case where the average value was used as the actual supply amount C. On the other hand, in the second comparison example, the measured supply amount C was out of the tolerance B soon after the start of the measurement and fluctuated larger and smaller than the set supply amount A for some time. However, when 10 minutes elapsed, the measured supply amount C lay within the tolerance B and thereafter, the fluctuation was suppressed gradually with the elapse of time. With the elapse of a little over 15 minutes, the measured supply amount C was almost in accord with 50 g which was the set supply amount A. Consequently, the resin pellet P produced soon after the start of the measurement was nonuniform in quality but the resin pellet P produced after 15 minutes elapsed after the start of the measurement was stable in quality.

The result of the first and second examples and the first and second comparison examples indicate that in the case where the measured supply amount C lies within the tolerance B, it is possible to execute the feedback control reliably by setting the feedback coefficient E to $0.1 \leq E \leq 0.7$. The result of the first and second examples and the first and second comparison examples also indicate that in the case where the actual supply amount C lies out of the tolerance B, it is possible to execute the feedback control reliably by setting the lower limit of the feedback coefficient E to numerical values in the neighborhood of 1.0 and the upper limit thereof to 1.2 or less.

In the third example and the third comparison example, the weighing device 11 measured the actual supply amount C at regular intervals of 60 seconds. The set supply amount A in 60 seconds was set to 200 g. The initial predetermined inverter frequency D was set to 35 Hz. In the third example, the feedback coefficient E was set to 0.5 in the case where the actual supply amount C lied within the tolerance B, whereas the feedback coefficient E was set not to 1.0 but to 0.8 to estimate the lower limit of the feedback coefficient E in the case where the actual supply amount C lied out of the tolerance B. In the third comparison example, the feedback coefficient E was set not to 0.1 but to 0.0 to check whether 0.1 was allowed as the lower limit thereof in the case where the actual supply amount C lay within the tolerance B. Where as the feedback coefficient E was set not to 0.8 of the third example but to 0.5 to check whether 0.5 was allowed as the lower limit thereof in the case where the actual supply amount C lay out of the tolerance B.

Figure 6:
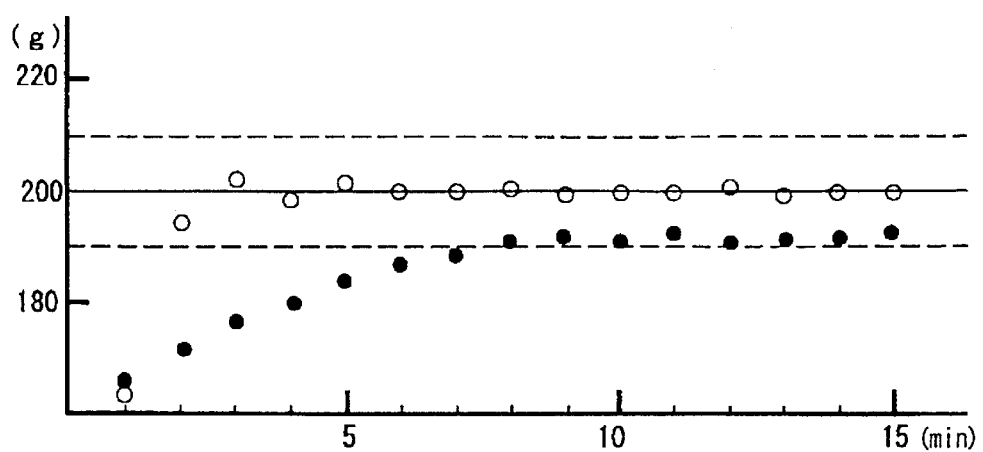
FIG. 6 is a graph showing a change of a measured supply amount with time in a third example and a third comparison example.

As shown in FIG. 6, in the third example, by setting the feedback coefficient E to the above-described numerical values, the powder Y was constantly supplied to the resin extruder 20 in an amount of 200 g which was the set supply amount A after two minutes from the start of the measurement and thereafter. Thus, the resin extruder 20 produced a uniform non-defective resin pellet P. In the third comparison example, the feedback coefficient E was set to the above-described numerical values. As a result, the measured supply amount C did not lie within the tolerance B in seven minutes from the start time of the measurement. After the measured supply amount C lay within the tolerance B, it did not approach 200 g that was the set supply amount A. Accordingly, the produced resin pellet P in the third comparison example was nonuniform in quality.

The result of the first, second, and third examples and the first, second, and third comparison examples indicate that it is possible to execute the feedback control reliably by setting the feedback coefficient E to $0.1 \leq E \leq 0.7$ in the case where the measured supply amount C lies within the tolerance B and to $0.8 \leq E \leq 1.2$ in the case where the actual supply amount C lies out of the tolerance B.

In the fourth example, the feedback control was executed by using the average supply amount Cn to check the range of the above-described estimated feedback coefficient E. The weighing device 11 measured the actual supply amount C at regular intervals of 30 seconds. The number (n) of measuring times for determining the average supply amount Cn was set to three. The set supply amount A in 30 seconds was set to 100 g. The tolerance B of the set supply amount A was set to 5 g. The initial predetermined inverter frequency D was set to 35 Hz. By setting thus, the feedback control was executed at regular intervals of 90 seconds. The feedback coefficient E was set to 0.2 in the case where the actual supply amount C measured lied within the tolerance B, whereas the feedback coefficient E was set to 1.0 in the case where the actual supply amount C lay out of the tolerance B.

Figure 7:
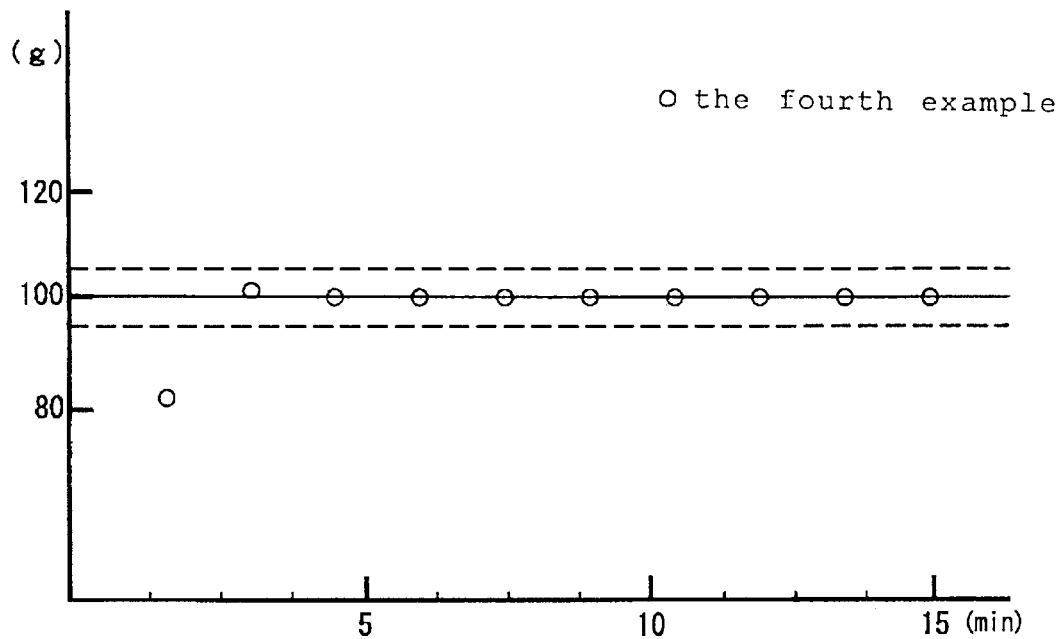
FIG. 7 is a graph showing a change of a measured supply amount with time in a fourth example.
Figure 8A:
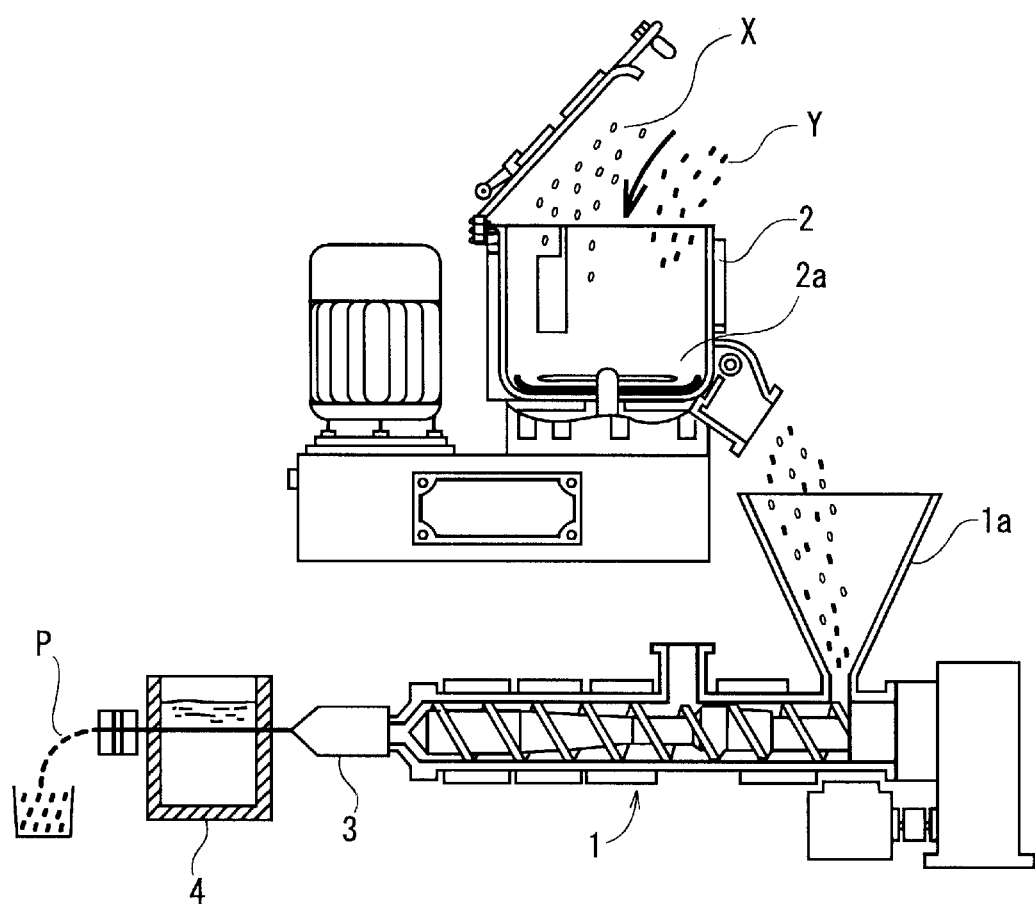
FIG. 8 is a schematic view showing a state in which powder is supplied to a resin extruder according to a conventional method.
Figure 8B:
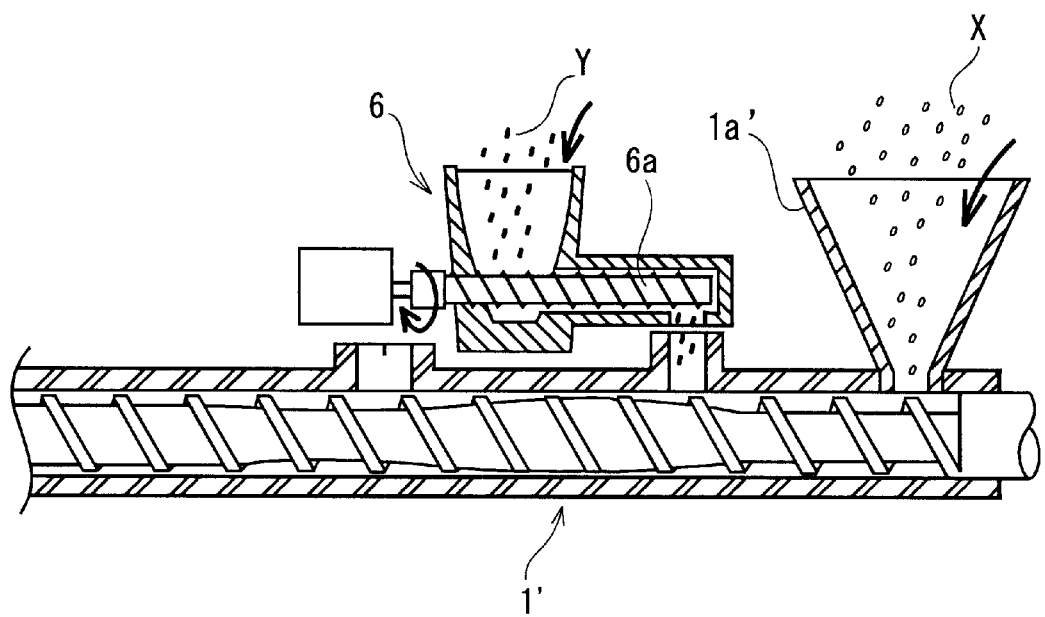
Figure 9:
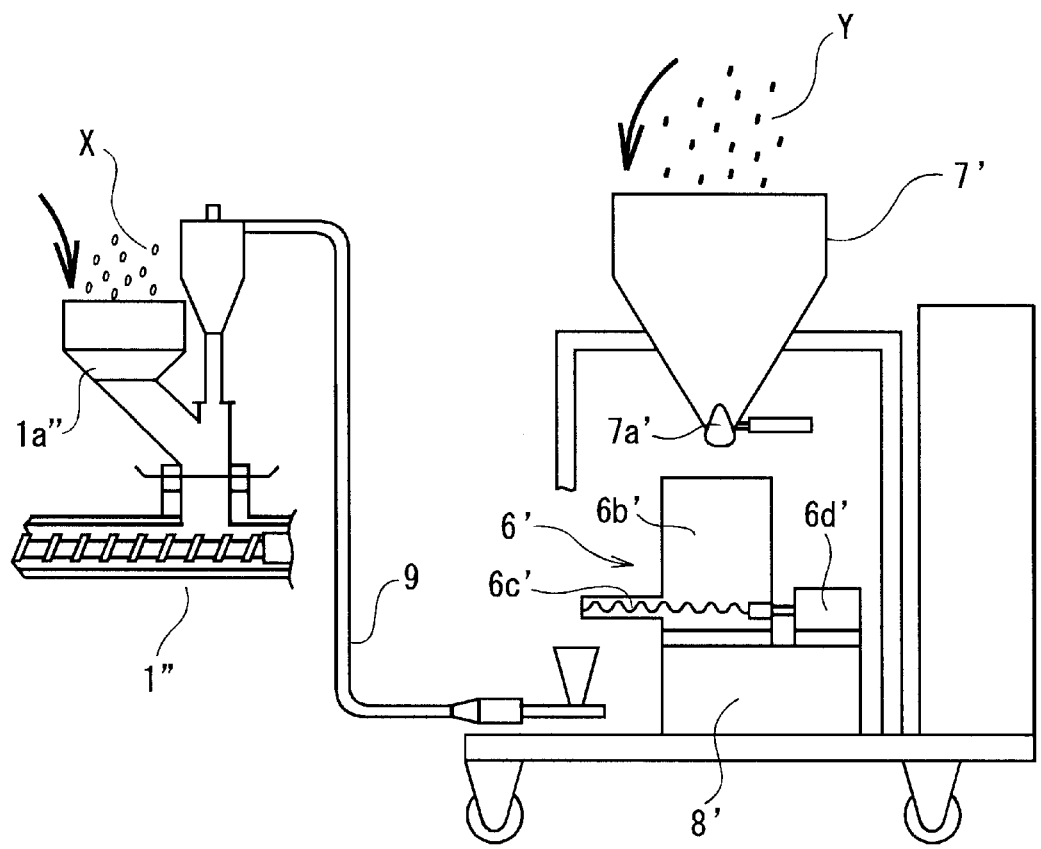
FIG. 9 is a schematic view showing a conventional powder feeder.

As shown by the graph of FIG. 7, in the fourth example, by setting the feedback coefficient E to the above-described numerical values, the fluctuation of the measured supply amount C was suppressed immediately and was almost in accord with 100 g which was the set supply amount A, although the measured supply amount C was out of the tolerance B soon after the measurement started. Thus, the powder Y was supplied to the resin extruder 20 stably and thus uniformly mixed with the resin X to form a uniform non-defective resin pellet P by the resin extruder 20. The result of the fourth example indicates that owing to the execution of the feedback control, it is possible to supply the predetermined amount of the powder Y to the resin extruder 20 by appropriately setting the feedback coefficient E to the above-described range both in the case where the measured supply amount C lies within and out of the tolerance B.

It is possible to changeably set the above-described numerical values such as the measuring time period and the set supply amount A of each example, according to materials and amounts of the resin X and the powder Y. For example, the weighing device 11 may measure the actual supply amount C at regular intervals in the range of 10 seconds to 180 seconds. The feedback control which is made by determining the average value is preferable in the case where vibrations generated by the drop of the powder Y to the resin extruder 20 are liable to affect measured values. According to the present invention, to determine the average supply amount, measurements are executed two to five times successively. As the number of measuring times is more, the average value becomes increasingly accurate. However, in this case, a response time period takes long until the feedback control is executed. Thus, it is not preferable to take the average value by executing measurements at six or more times. Instead, it is preferable to shorten each measuring time period. It is also preferable to take the average value by executing measurements at five or more times when a highly accurate weighing device is used.

If it is difficult to synchronize an initial supply timing of the powder Y to the resin extruder 20 with the operational situation of the resin extruder 20 or with the resin X, a mixture of the powder Y and the resin X may be supplied to the resin extruder 20 in a certain early period of time after the start of the operation of the resin extrusion apparatus.

As apparent from the foregoing description, according to the present invention, the detection means such as the weighing device detects the supply amount of the powder to be added to the resin, the feedback control is executed based on the result of the detection, the feedback coefficient is separately and appropriately set to numerical values for the case where the measured supply amount of the powder supply amount lies within the tolerance and for the case where the measured supply amount of the powder supply amount lies out the tolerance, and set numerical values are substituted into the programmed equation stored in the controller to execute the feedback control. Therefore, the quantitative supply of the powder to the resin extruder can be accomplished reliably.

As another advantage of the present invention, because the supply position of the powder to the resin extruder is different from that of the resin, it is possible to supply the powder and the resin to the resin extruder at set proportions, respectively without the powder and the resin interacting with each other. Thus, the resin and the powder can be mixed with each other uniformly by the resin extruder to form the resin pellet having non-uniformity.

What is claimed is:

1. A resin extrusion apparatus comprising:

a resin extruder for extruding a thermoplastic resin supplied thereto from one end thereof to the outside from the other end thereof;

a screw, driven by a motor, for supplying powder from a powder container to said resin extruder at an intermediate portion thereof, an inverter for setting the number of rotations of said motor for driving said screw;

a controller controlling a frequency of said inverter;

a weighing device, connected to said controller, for measuring an actual supply amount of said powder in a predetermined time period; and a detector for transmitting a measured value of said weighing device to said controller, wherein a set supply amount (g) of said powder in said predetermined time period is A; a tolerance (g) of said set supply amount is B; said actual supply amount (g) of said powder, in said predetermined time period, measured by said weighing device is C; a frequency (Hz) of said inverter is D; a feedback coefficient is E; and a frequency (Hz) of said inverter after a feedback control is executed is F, when $|A-C| \leq B$, said feedback coefficient E is set in the range of $0.1 \leq E \leq 0.7$ and when $|A-C| > B$, said feedback coefficient E is set in the range of $0.8 \leq E \leq 1.2$, whereby said powder is quantitatively supplied to said intermediate portion of said resin extruder by means of a rotation of said screw, based on said feedback-controlled inverter frequency:

$$F=D+E\times\{(A-C)\times D/C\}.$$

2. The resin extrusion apparatus according to claim 1, wherein said feedback control is executed for each average value computed based on measured supply amounts of said powder detected by measurements executed two to five times successively and used as said measured supply amount C in a predetermined period of time.

3. The resin extrusion apparatus according to claim 1, wherein said feedback control is executed in correspondence to the measurement of the actual supply amount of said powder, which is executed at regular intervals in the range of 10 seconds to 180 seconds.

4. The resin extrusion apparatus according to claim 2, wherein said feedback control is executed in correspondence to the measurement of the actual supply amount of said powder, which is executed at regular intervals in the range of 10 seconds to 180 seconds.

\* \* \* \* \*